United States Patent Office 3,396,144
Patented Aug. 6, 1968

3,396,144
ULTRAVIOLET LIGHT STABILIZED HALOGEN-ATED SYNTHETIC RESINS CONTAINING ZINC SALTS OF PHOSPHORUS COMPOUNDS
Robert C. Harrington, Jr., and James L. Smith, Kingsport, Tenn., assignors to Eastman Kodak Company, Rochester, N.Y., a corporation of New Jersey
No Drawing. Filed Jan. 25, 1960, Ser. No. 4,187
The portion of the term of the patent subsequent to Sept. 20, 1983, has been disclaimed
8 Claims. (Cl. 260—45.75)

ABSTRACT OF THE DISCLOSURE

A resinous film-forming polymeric composition stabilized against color degradation due to actinic radiation comprising (A) a polymeric component selected from the group consisting of homopolymers of halogenated mono-olefinic organic hydrocarbons, copolymers of halogenated mono-olefinic organic hydrocarbons with each other, and mixtures of (1) homopolymers and copolymers of halogenated mono-olefinic organic hydrocarbons and (2) homopolymers and copolymers of N-alkyl acrylamide, and (B) a stabilizing amount of a zinc stabilizer selected from the group consisting of zinc salts of mono- and dialkylated phosphates, zinc salts of mono- and dialkylated phosphites, and zinc salts of mono- and dialkylated phosphonates.

---

This invention relates to ultraviolet light stabilized halogenated synthetic resins containing zinc salts of phosphorus compounds.

The prior art discloses the use of zinc, lead, tin, and other organo metallic phosphorus compounds in paraffin, synthetic rubber, etc. for various purposes; however, the use of the zinc salts of this invention is not only novel but very unexpectedly results in stability to actinic radiation such as ultraviolet light in halogenated synthetic resins as described below.

A very large number of compounds which are known heat or oxidation stabilizers are not useful for protection against actinic radiation, hence, the discovery of this invention is quite unobvious besides being novel and exceptionally useful. Another valuable feature of this invention is the high degree of compatibility of the stabilizers in the polymer composition.

One theory as to the instability of halogen-containing vinyl resins toward actinic radiation is that discoloration is probably due to radiation catalyzed loss of hydrogen halide (HX) from the polymer molecule and subsequent combined cross-linked and breakdown. Tests of various stabilizers useful as regards heat and oxidation degradation reveal that such stabilizers are generally of relatively little value in preventing ultraviolet discoloration so that there is a definite loss of effectiveness after 20 hours of Fade-Ometer apparatus exposure. The particular type employed is designated Type FDA-R with an enclosed carbon arc lamp and controlled ultraviolet light, temperature and humidity.

Various patents mention organo-phosphorus compounds as stabilizers against thermal degradation or oxidative deterioration. Moreover, some organic zinc, cadmium and other metallic compounds are known to be somewhat effective as light stabilizers but are generally inferior stabilizers for oxidative or thermal degradation. Such prior art recognizes that stabilizing action in one substrate by a given compound does not mean that it will have similar value in another; thus, an especially good stabilizer for any one substrate such as rubber, paraffin, vegetable oils, halogenated resins, polyesters, fats, etc. is not likely to be an especially good stabilizer for any other such substrate. Moreover, the fact that a number of metallic salts of organic compounds or various organo-metallic compounds are useful as stabilizers in various substrates does not, ipso facto, render obvious the use of each and every one of this tremendous class of compounds in the same or different substrates. Unobviousness in the present case is especially evident since the broadly recognized general rule in this art is that a given metal-containing organic compound not previously tested will probably have stabilizing properties inferior to compounds already in acceptable use in the art and that such inferior stabilizing properties will only be of significance with regard to heat or oxidative or ultraviolet deterioration, not as to all three forms of degradation. Thus, the art in this field has progressed to a point where there is no longer any unobviousness in the mere existence of stabilizing properties in a metal-containing organic compound in any given substrate, and yet there is no way of predicting which of such compounds will be found to have especially good properties in any given substrate. The present invention does not relate to oxidative deterioration insofar as it is distinct from deterioration caused by sunlight, heat, etc.

The halogenated synthetic resins contemplated by this invention such as homopolymers and copolymers prepared from vinylidenechloride are notable for poor stability to light and heat. Polymers such as polyvinylidenechloride and vinylidenechloride copolymerized with other compounds capable of polymerization such as acrylonitrile, methylacrylate, and vinylacetate when heated above about 125° C. or when exposed to light, especially ultraviolet light, turn brown. It is therefore a practice to add stabilizers to such materials. Known stabilizers are many and varied in structure. Formulations of plastics to be used for manufacture of specific articles usually specify 2 to 5%, commonly 3%, of a mixture of stabilizers. At least two and often three or four stabilizers are usually required. The two types of degradation resulting in color formation, one due to heat and the other due to light, are different. While a given stabilizer may work for one or the other type, it is uncommon to find one effective for both. In fact, the opposite is often the case. A stabilizer will be effective against heat degradation but augment light deterioration. Also, the opposite is often the case.

It has been discovered that mercaptoacetic acid can be combined with zinc alkylphosphates to produce a stabilizer which is much better than a simple mixture. This stabilizer when used in a copolymer prepared from vinylidenechloride and another polymerizeable compound in conjunction with a poly-N-alkylacrylamide or poly-N-alkylmethacrylamide has marked advantages.

Moreover, it has been found that zinc alkyl phosphates, zinc dialkyl phosphates, zinc alkyl phosphonates, zinc bis(alkyl) phosphonates, zinc alkyl phosphites, zinc dialkyl phosphites and other chemically equivalent alkylated zinc salts of phosphorus acids are especially good stabilizers against deterioration of halogenated synthetic resins caused by actinic radiation such as sunlight or ultraviolet light.

In addition, it has been surprisingly discovered that such compounds as zinc ethyl phosphate in fibers or film of halogenated synthetic resins render them exceptionally receptive to dispersed dyes, basic dyes and premetalized dyes such as Cibalan Blue BL, Eastman Fast Red N–GLF, Maxilon Blue RLA, etc. Thus, fibers can be dyed to heavier shades than the same fiber without the zinc compound. When deep shades of yarn are desired, it is common to use a dye-carrier which must be added to the dye bath. The use of a dye-carrier is expensive and necessitates an exceptionally thorough scour after dyeing in order to remove the carrier. Fibers containing the zinc compounds disclosed in this invention can be dyed to the same depth of color without the use of a carrier as can be achieved with control fibers when a carrier is used. A still further advantage of this invention is that with the use of the zinc compounds the fiber does not take dye so readily as to make the dyeing of pastel shades uneven. A fiber can be made to take dyes too readily so that uneven light colored shades are obtained.

It is an object of this invention to provide novel compositions of matter comprising halogenated synthetic resins stabilized to a high degree against actinic radiation degradation in all cases and in some cases also against thermal degradation. It is another object to provide such resins whereby fibers, film and other objects have improved dye receptivity contributed by the same compound that serves as the stabilizer. A further object is to provide an especially valuable novel stabilizer composition by combining mercaptoacetic acid with an alkylated zinc phosphate.

An additional object is to provide stabilizers effective in low concentration, of low cost, low toxicity, solubility in fiber and film-forming dopes such as acetone dopes, but having insolubility in water and common solvents, having compatibility and permanence in halogenated resin substrates so as to eliminate exudation, blooming, or evaporation, and other advantageous characteristics.

Other objects have already been made apparent or will become apparent hereinafter.

A preferred embodiment of this invention provides a resinous film-forming polymer composition stabilized against color degradation due to actinic radiation comprising at least 25 mole percent based on the resinous polymeric components of a highly polymeric halogenated mono-olefinic polymerizable organic hydrocarbon compound, which polymer composition contains from 0.05 to about 5 percent by weight of the polymer composition of a zinc stabilizer selected from the group consisting of (1) zinc salts of mono- and dialkylated phosphates, (2) zinc salts of mono- and dialkylated phosphites, (3) zinc salts of mono- and dialkylated phosphonates, and (4) the reaction product of said zinc stabilizer (1) and mercaptoacetic acid, each of said alkyl radicals containing from 1 to 8 carbon atoms, said polymer composition being capable of remaining substantially undiscolored for at least 60 hours under exposure to actinic radiation which would substantially discolor an unstabilized polymer composition in 20 hours.

Particularly important embodiments of this invention comprise stabilizing against actinic radiation deterioration the mono-olefinic fiber-forming polymers which are primarily mechanical mixtures and/or which are homopolymers or copolymers such as graft type or back-bone type copolymers of (A) 70% to 95% by weight of (A) plus (B) of a copolymer of (1) from 30% to 65% by weight vinylidene chloride and (2) 70% to 35% by weight of acrylonitrile, and (B) 30% to 5% by weight of (A) plus (B) of a polymer selected from the group consisting of (1) a homopolymer of an N-alkylacrylamide wherein the alkyl group contains from 1 to 6 carbon atoms, (2) a copolymer of N-alkyl acrylamide and N-alkyl methacrylamide wherein each alkyl group contains 1 to 6 carbon atoms, and (3) a copolymer consisting of at least 50% by weight of an N-alkyl acrylamide wherein the alkyl group contains 1 to 6 carbon atoms and not more than 50% by weight of a polymerizable monovinyl pyridine monomer.

However, this invention also advantageously covers any of the film-forming polymers, mixed polymers and copolymers of vinyl chloride, vinylidene chloride and other polymerizable halogenated mono-olefinic hydrocarbons containing from 2 to 15 carbon atoms, e.g. chlorinated vinyl naphthalene copolymers, chlorinated vinyl laurate copolymers, polychlorostyrene, etc. The copolymeric or admixed polymeric constituent free of halogen is advantageously not in excess of 75% by weight of the entire polymer composition and can be derived from any of the compatible mono-olefinic polymerizable organic compounds containing from 2 to 20 carbon atoms such as acrylonitrile, vinyl acetate, methyl methacrylate, styrene, vinyl alcohol, vinyl propionate, ethyl acrylate, acrylamide, vinyl bromide, N-methyl acrylamide, vinylidene bromide, monovinyl pyridine, N-butyl methacrylamide, monovinyl hydroquinone, monovinyl benzophenone, monovinyl cyclohexane, tetrafluoroethylene, etc. Those skilled in the art are well aware of the vast variety of such polymers, copolymers and mixtures thereof, hence there is no point in burdening this specification by further elaboration.

As already made clear, this invention relates to stability toward actinic radiation of fiber and film-forming polymers and is not concerned with rubbery compositions, adhesives, impregnating compositions, cross-linked polymers of divinyl compounds or conjugated di-olefins, etc. which are of no value in rope, wire insulation, fabrics, protective wrappings, artificial leather, clothing, tent fabrics, automobile convertible tops, seat covers, upholstery, draperies, rugs, and other fiber, film or extruded products which may be subjected to considerable actinic radiation, sunlight being especially likely to cause damage.

Two advantages of the stabilizer compounds of this invention are their considerably lesser cost and their reduced toxicity with respect to tin compounds. Moreover, the zinc stabilizers of this invention constitute an exceptionally advantageous class of stabilizers against ultraviolet degradation despite the fact that most organo metallic compounds are of relatively little effectiveness, usually being so little as to give no indication of the surprisingly discovered value of the zinc salts used according to the present invention.

Zinc diethyl phosphite can be prepared by several known methods of synthesis but the one preferred involves the use of triethyl phosphite and anhydrous zinc chloride. Two moles of triethyl phosphite and one mole of anhydrous zinc chloride are heated under anhydrous conditions at refluxing temperature for one and one-half hours. The product is a clear colorless liquid. Stabilizers in liquid form are preferred by many since a liquid is easier to handle in most processes than a powder or solid. The inhibitor may be added to the resins by spraying it on the outside, adding it to a melt of the resins or by adding it to a solution of the resin. It is preferred to add the zinc diethyl phosphite to a solution of the resins. The concentration of inhibitor needed depends upon the instability of the resin being stabilized. While it is preferred to use a concentration of 1%, concentrations as low as 0.1% or as high as 3% may be employed. We have found that the higher the concentration used, the greater the stability, but one need not use more stabilizer than that necessary to accomplish a desired degree of stability, e.g. 1%.

When zinc diethyl phosphite was used at a concentration of 1% in a typical vinylidene chloride resin and compared to the more effective light stabilizers known for this resin, it was proved as effective as dibutyl tin maleate, the best of the group. The following table is presented to illustrate this point.

| Compound | Percent Added* | Fade-Ometer Exposure Hours | Color |
| --- | --- | --- | --- |
| Di-n-butyl tin diacetate | 1 | 20 | Clear. |
| | | 40 | Tan. |
| Di-n-butyl tin maleate | 1 | 20 | Light tan. |
| | | 40 | Tan. |
| Di-n-butyl tin dilaurate | 1 | 20 | Light tan. |
| | | 40 | Brown. |
| Zinc diethyl phosphite | 1 | 20 | |
| | | 40 | Clear. |
| | | 60 | |
| Control | | 20 | Brown. |

*Based on resin solids.

It is obvious that all of the zinc salts of this invention can be mono-alkyl or dialkyl zinc compounds wherein the alkyl radicals can contain one or more carbon atoms such as methyl, ethyl, hexyl, isopropyl, tert.amyl sec. butyl, octyl, etc. without materially changing the inhibitor qualities of the alkylated zinc phosphites or other alkylated salts of phosphorus acids.

The following examples will serve to further illustrate the use of alkylated zinc phosphites according to this invention.

Example 1

An amount of zinc diethyl phosphite equal to 1%, based upon the polymer weight, was added to a 27% solution of a vinylidene chloride resin in a solvent. Thin sheets of the resin were prepared and tested in a Fade-Ometer. The sheets did not show darkening or discoloration after 60 hours of exposure while a control containing no inhibitor was appreciably darkened after 20 hours.

Example 2

A solution of vinylidene chloride resin containing 1% zinc diethyl phosphite, based upon polymer weight, and prepared as in Example 1 was extruded through small orifices into a drying chamber to produce filament yarn. The yarn was tested in a Fade-Ometer and did not show darkening or discoloration after 60 hours exposure while a control sample containing no inhibitor was darkened in 20 hours.

In the above and other examples the solvent employed is acetone.

The zinc dialkyl phosphates may be prepared by several known methods; however, the simplest known method is the reaction of one mole of anhydrous zinc chloride with two moles of a trialkyl phosphate ester. Two moles of the alkyl chloride is removed during the reaction after which the compound is collected ready for use without the necessity of further treatment or purification. These compounds vary in nature from white solids to clear liquids, depending on the nature of the alkyl group. The following example illustrates, in detail, the synthesis of one of these compounds:

Example 3

Preparation of zinc diethyl phosphate: Two moles (364 gms.) of triethyl phosphate are placed in 3-neck flask fitted with a stirrer and reflux condenser. To this is added one mole (136 gms.) of anhydrous zinc chloride. This mixture is stilled and heated to about 90° C. (this temperature varies with the alkyl group on the phosphate ester) at which point, ethyl chloride is evolved. Although the reaction then becomes exothermic, heat is supplied until the reaction mixture begins to solidify. Prior to complete solidification, however, the zinc diethyl phosphate is removed from the flask and is ready for use.

Other zinc alkyl and dialkyl phosphates such as the butyl, isobutyl, amyl, and 2-ethyl hexyl may be prepared in similar fashion by starting with the appropriate trialkyl phosphate and following essentially the same steps as outlined in Example 3 above. In this connection, the higher alkyl chlorides boil at higher temperatures and thus higher reaction temperatures must therefore be used for their removal.

When zinc diethyl phosphate was used at a concentration of 1% in a typical vinylidene chloride resin and compared to the more effective light stabilizers known for this resin, it was proved to be more effective than di-n-butyl tin dilaurate, the best of the group. The following table is presented to illustrate this point.

| Compound | Percent Added* | Fade-Ometer Exposure Hours | Color |
| --- | --- | --- | --- |
| Di-n-butyl tin diacetate | 1 | 20 | Clear. |
| | | 40 | Tan. |
| Di-n-butyl tin maleate | 1 | 20 | Light tan. |
| | | 40 | Tan. |
| Di-n-butyl tin dilaurate | 1 | 20 | Light tan. |
| | | 40 | Brown. |
| Zinc diethyl phosphate | 1 | 20 | |
| | | 40 | Clear. |
| | | 60 | |
| Control | | 20 | Brown. |

*Based on resin solids.

Example 4

An amount of zinc diethyl phosphate equal to 1%, based upon the polymer weight, was added to a 27% solution of a vinylidene chloride resin in a solvent. Thin sheets of the resin were prepared and tested in a Fade-Ometer. The sheets did not show darkening or discoloration after 60 hours exposure while a control containing no inhibitor was appreciably darkened after 20 hours.

Example 5

A solution of vinylidene chloride resin containing 1% zinc diethyl phosphate, based upon polymer weight, and prepared as in Example 4 was exuded through small orifices into a drying chamber to produce filament yarn. The yarn was tested in a Fade-Ometer and did not show darkening or discloloration after 60 hours exposure while a control sample containing no inhibitor was darkened in 20 hours.

As between the dialkyl and mono-alkyl zinc phosphates the mono-alkylated lower alkyl salts are the most reliable and give the greatest protection against discoloration under various conditions, especially during heating. Thus, the mono-ethyl zinc phosphate is a heat stabilizer as well as a stabilizer against sunlight. The same applies to compounds having a propyl, butyl or methyl radical. The following example illustrates the preparation of zinc ethyl phosphate which is especially preferred:

Example 6

Two moles of triethyl phosphate were placed in a three-neck flask fitted with a stirrer, thermometer, and reflux condenser. To this was added two moles of anhydrous zinc chloride. This mixture was stirred and heated to about 140° C. at which point ethyl chloride was evolved. After cooling, this material was a sticky semi-fluid mass. An amount of this material equal to 1% based on polymer weight was added to a 27% solution of a vinylidene chloride containing resin in a solvent. This solution was extruded through small orifices into a drying chamber to product yarn fibers. The yarn was tested in a Fade-Ometer and did not show darkening or discoloration after 60 hours exposure, while a control sample containing no inhibitor was darkened in 20 hours. Yarn of polyvinylidene chloride-acrylonitrile copolymers had greatly improved dyeability, heat stability and light stability when it contained zinc ethyl phosphate. Useful dyes are mentioned above and a 1% concentration gives light stability in a Fade-Ometer test well beyond 60 hours together with ability to withstand ironing temperatures used for clothing without discoloration.

Many zinc compounds are ineffective for the purposes of this invention, e.g. zinc phosphate. A characteristic of the zinc salts of this invention is that zinc is connected to phosphorous through an oxygen linkage in a manner similar to any other inorganic salt. The presence of the alkyl radical or radicals (which are not directly connected to the zinc atom) seems to contribute quite unexpected properties. These compounds are not organo-metallic compounds.

The present invention is not related to the use of zinc dialkyl dithiophosphates and some other zinc compounds which are useful in stabilizing some polymers against the action of heat, especially since in halogenated synthetic resins of the type contemplated herein mercaptoacetic acid and other sulfur-containing compounds are more effective as thermal degradation inhibitors but are not sunlight stabilizers.

As mentioned above a great number of heat stabilizers are of no value as light stabilizers for the purposes of this invention. Ineffective compounds which have been tested also include oxidation inhibitors, e.g. hydroquinone derivatives, gallic acid derivatives, etc. A few of the many compounds found to be ineffective as light stabilizers include bis(dimethyl thiocarbamyl) disulfide, hydroquinone, 2-mercaptobenzothiazole, zinc pentachlorophenate, thiourea, aluminum pyrophosphate, diphenyl tin oxide, di-2-ethylhexyl hydrogen phosphite, acid esters of phosphorus, para-tert.butylphenol, calcium stearate, tin diethyl phosphate, tin tetrakis (diethyl phosphate) triesters of phosphorus and over one hundred other compounds and proprietary commercial stabilizers which might be supposed to have prospective value including calcium, aluminum, lead, tin, zinc, barium, titanium and other metal-containing organic compounds.

The structures of a typical stabilizer compound covered by this invention, e.g. alkylated zinc phosphates are as follows:

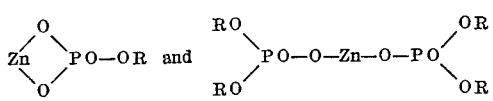

wherein each R represents an alkyl radical having from 1 to about 8 carbon atoms.

In addition to the method disclosed above for making some of the stabilizers of this invention, an alternate method can be illustrated as follows:

Example 7

Zinc bis diethyl phosphate.—Two moles (364 grams) of triethyl phosphate are reacted with one mole (183.5 grams) of zinc acetate. The mixture is heated, with stirring until 1½ moles (132 grams) of ethyl acetate is recovered. The product, zinc bis diethyl phosphate may then be considered ready for use.

Example 8

Zinc ethyl phosphate.—One mole (182 grams) of triethyl phosphate is reacted with one mole (183.5 grams) of zinc acetate. Heating and stirring are continued until about 75% of the theoretical amount of ethyl acetate is collected, after which the product, zinc ethyl phosphate, is ready for use.

There are, of course, other ways to prepare these compounds, and in some, solvents may be used to facilitate stirring. One good solvent is dimethyl formamide.

The zinc alkyl phosphonates and bis alkyl (alkyl phosphonates) may be prepared by several known methods. However, the simplest known method is the reaction of one mole of zinc chloride with one mole of a diethyl (alkyl phosphonate) to form the zinc alkyl phosphonates, and the reaction of one mole of zinc chloride with two moles of a diethyl (alkyl phosphonate) to form the zinc bis ethyl (alkyl phosphonates). In both cases, two moles of ethyl chloride are removed during the reaction. The products formed from this reaction are sticky semi-solid masses in both cases and are ready for use without further treatment or purification.

Example 9

Preparation of zinc (ethyl phosphonate). One mole (166 grams) of diethyl (ethyl phosphonate) is placed in a three-neck flask equipped with a stirrer and a reflux condenser. To this, is added one mole (136 grams) of anhydrous zinc chloride. Stirring is commenced, and the mixture heated to 130° C., at which point, ethyl chloride is released from the reaction. Heating and stirring is continued until about 75% of theory of ethyl chloride has been removed. The reaction is considered to be complete at this point, and the zinc ethyl phosphonate is ready for use.

Example 10

Preparation of zinc (ethyl phosphonate). One mole (166 grams) of diethyl (ethyl phosphonate) is placed in a three-neck flask equipped with a stirrer and a distillation head. To this, is added one mole (183 grams) of zinc acetate. Stirring and heating are started, and after 75% of theory of ethyl acetate has been collected, the reaction is considered to be complete, and the product is collected as being ready for use.

Example 11

Preparation of zinc bis ethyl (ethyl phosphonate). Two moles (332 grams) of diethyl (ethyl phosphonate) are placed in a three-neck flask equipped with a stirrer and distillation setup complete with a Dry Ice trap. To this is added 136 grams of zinc chloride. Heating and stirring are commenced, and when the mixture reaches 130° C., ethyl chloride is evolved, and condensed in the Dry Ice trap. After about 75: of theory of ethyl chloride has been recovered from the reaction, it is considered to be complete, and the product, zinc bis ethyl (ethyl phosphonate), is ready for use.

Example 12

Preparation of zinc bis ethyl (ethyl phosphonate). Two moles (332 grams) of diethyl (ethyl phosphonate) are placed in a three-neck flask equipped with a stirrer and a still head. To this, is added one mole (183 grams) of zinc acetate. Heating and stirring are commenced until ethyl acetate begins to distill over. The reaction is continued until 75% of theory of ethyl acetate is collected. At this point, the reaction is considered to be complete, and the product is ready for use without further treatment.

Other zinc alkyl (alkyl phosphonates) and zinc (alkyl phosphonates) may be prepared in similar manner by using the proper reactants. Examples are: zinc bis isobutyl (ethyl phosphonate), zinc (isobutyl phosphonate), zinc bis amyl (isobutyl phosphonate), zinc (isobutyl phosphonate), and others of these same types. The structural formulas for these compounds are thought to be as follows:

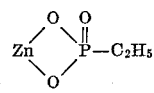 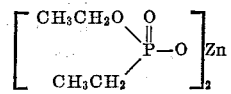

Zinc (ethyl phosphonate)   Zinc ethyl (ethyl phosphonate)

When the phosphonate compounds of this invention are added to polymers as described in the tables hereinabove at a concentration of 1% the following data is obtained:

| Compound | Percent Added* | Fade-Ometer Exposure Hours | Color |
|---|---|---|---|
| Di-n-butyl tin diacetate | 1 | 20 | Clear. |
|  |  | 40 | Tan. |
| Di-n-butyl tin maleate | 1 | 20 | Light tan. |
|  |  | 40 | Tan. |
| Di-n-butyl tin dilaurate | 1 | 20 | Light tan |
|  |  | 40 | Brown. |
| Zinc (ethyl phosphonate) | 1 | 20 | |
|  |  | 40 | Clear. |
|  |  | 80 | |
| Zinc bis ethyl (ethyl phosphate) | 1 | 20 | |
|  |  | 40 | Clear |
|  |  | 80 | |
| Control |  | 20 | Brown. |

*Based on polymer solids.

The following examples will serve to further illustrate this invention; the polymer dope being a modified vinylidene chloride-acrylonitrile copolymer (about 50:50):

Example 13

An amount of zinc (ethyl phosphonate) equal to 1% based on polymer weight was added to a 27% acetone dope. Yarn spun from this dope was tested in a Fade-Ometer and showed no discoloration after 80 hours exposure to ultraviolet light. A control containing no additive and tested under the same conditions turned brown in 20 hours.

Example 14

An amount of zinc bis[ethyl (ethyl phosphonate)] equal to 1% based on the polymer weight was incorporated into a 27% solids in acetone dope. Fibers spun from this dope were tested in a Fade-Ometer and showed no discoloration after 80 hours exposure to ultraviolet light. A control containing no additive and tested under the same conditions turned brown in 20 hours.

The next aspect of this invention provides an especially unobvious embodiment and involves the combination of mercaptoacetic acid and alkylated zinc phosphates, the latter being individually disclosed above. Mercaptoacetic acid is a known stabilizer effective against heat degradation of polymers.

When mercaptoacetic acid and an alkylated zinc phosphate are added separately to spinning solutions or dopes for film or fibers, the resulting yarn or film has light stability properties as described above when a compound such as zinc ethyl phosphate is added without the mercaptoacetic acid. But if the two are combined under conditions favorable for reaction and subsequently added to the spinning solution, the increase in desirable properties is surprising and remarkable. Although the structure of the reaction product or complex is not known, the product shows improved performance over a mixture of mercaptoacetic acid and zinc ethyl phosphate and over all other tested inhibitors both commercial and experimental. Well over 100 such materials have been tested.

The reaction product according to this aspect of the invention is prepared by reacting triethyl phosphate with zinc chloride until ethyl chloride is evolved, and the material becomes viscous. After cooling to about 95° C., mercaptoacetic acid is added and stirring is continued until a clear but less viscous, acetone-soluble, homogeneous material is obtained.

The reaction is unique in that the conditions necessary to prepare a satisfactory product can be varied over wide limits without causing a discernable effect on the desirable properties of the stabilizer. For example, the ratio of zinc chloride to triethyl phosphate can be varied from one mole of zinc chloride to two moles of triethylphosphate to two moles of zinc chloride to three moles of triethylphosphate. However, we prefer to use a mole ratio of one to one. The temperature of the reaction and time are interdependent in determining, during the zinc chloride-triethylphosphate reaction step, the amount of ethyl chloride which will be evolved. Theoretically, for every mole of chloride, added in the form of zinc chloride, a mole of ethyl chloride can be evolved. But the fraction of the theoretical amount which should be removed in order to obtain a satisfactory product has been found to be not very critical. For example, one can remove from 20% to 95% of the theoretical amount and prepare a satisfactory product. However, it is preferred to remove about 75% of the theoretical amount when a mole ratio of zinc chloride to triethylphosphate of one-to-one is employed. The noncriticality of the amount of ethyl chloride to remove is surprising since it is speculated in the literature that chloride ion is deleterious to stability of such polymers and, if all ethyl chloride were not removed, chlorine would remain in the ionic form.

The amount of mercaptoacetic acid added to the reaction product of zinc chloride and triethylphosphate also can be varied. The mercaptoacetic acid can be added either in the pure form or as an aqueous solution. For example, 100% mercaptoacetic acid and also 70% mercaptoacetic acid in water have been added without causing a notable difference in the final stabilizing properties. However, the viscosity of the stabilizer is much higher if the 100% mercaptoacetic acid is used. The amount of mercaptoacetic acid used can be varied from 10% to 40% of the weight of product prepared by reacting zinc chloride and triethylphosphate. Calculation of the amount of mercaptoacetic added in the case of aqueous solutions is based upon the concentration of mercaptoacetic acid in the solution. It is preferred to use 30 parts of 70% mercaptoacetic acid based on the zinc chloride-triethylphosphate product. The reaction time for mercaptoacetic acid with the zinc chloride-triethylphosphate reaction product can be varied from ten minutes at 95° C. to 30 minutes at 125° C. If an aqueous solution of mercaptoacetic acid is reacted with the zinc chloride-triethylphosphate reaction product at over 100° C., naturally, there is a loss of water by vaporization. This loss does not affect the performance of the stabilizer only it will raise the viscosity. The reaction product is of (1) a condensation product of a trialkyl phosphate condensed at from 100° C. to 200° C. with a zinc halide wherein at least 75% of theoretical alkyl halide is eliminated and (2) from 10% to 40% by weight of condensation product (1) of mercaptoacetic acid, said reaction being at from 90° C. to 140° C., said alkyl radicals having from 1 to 6 carbons and said halide being selected from the group consisting of fluoride, chloride, bromide and iodide.

The mercaptoacetic alkalated zinc phosphate stabilizers prepared as described serve to optimum advantage in polymers or copolymers of vinyl chloride or vinylidene chloride which have been modified to include a minor percentage of one or more polymers of N-alkyl alkanoic acid amides of the structure:

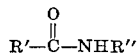

R″ can be any alkyl group containing up to six carbon atoms. Examples of such groups are methyl, ethyl, isopropyl, and hexyl. R′ can be a wide variety of alkyl groups dictated to some extent by the end use of the polymer. For example in fibers, it is preferred to use poly-N-isopropylacrylamide where the R′ group is a n-alkyl chain with —CONHCH(CH$_3$)$_2$ groups attached to alternate carbon atoms. Nonpolymeric N-substituted amides will also work but are more likely to be removed from fibers by common solvents than the polymeric material.

The zinc chloride - triethylphosphate - mercaptoacetic acid stabilizer can be used by itself to achieve advantageous stabilization. But if it is used in the vinylidene chloride polymer or copolymer in conjunction with the amide, the degree of stabilization is much greater.

The stabilizer shows advantageous effects when used as low as 0.25% based upon polymer weight when the polymer contains 12% to 18% poly-N-alkylacrylamide. As the stabilizer concentration is increased to 1% the light stabilization and heat stabilization increases about linearly. As the concentration is increased above 1% to about 3%, the rate of increase of stabilization levels off so that above 3% an increase in stabilizer will only increase the stability to a very small degree.

However, there is another major advantageous effect derived from using the stabilizer in fibers. Fiber containing the combination of stabilizer and a poly-N-alkacrylamide will take most types of dyes more readily to give deeper shades. The improvement in dyeability increases as the concentration of stabilizer is increased at a rapid rate until the stabilizer level is about 4%. Above 4% the rate of increase of ease of dyeing levels off.

The concentration of poly-N-alkylacrylamide necessary to achieve the increase in stability can be varied from 12% to about 18% in the presence of the stabilizer. When the concentration of amide is below 12%, the light stability is lowered, but there is no effect on heat stability or dye take-up. There is no increase in light stability when the amide concentration is raised above 18%, and neither is there an increase in heat stability or dye take-up.

In summary, a stabilizer prepared by reacting zinc chloride with triethylphosphate and subsequently reacting this product with mercaptoacetic acid is effective for stabilization of polymers prepared from vinylidenechloride. The effects of the stabilizer can be further improved by incorporating in the polymer N-alkyl amides. If the polymers are used in the form of fibers, a further advantage is achieved by the use of the stabilizer. The advantage is an increase in dyeability of the fibers.

Especially valuable results according to this aspect of the invention are obtained with regard to vinylidene chloride/acrylonitrile copolymers (about 45% minimum percentage of each) mixed with 12 to 18% or less desirably 10 to 25% of a polymer of N-alkyl (1 to 6 carbons) acrylamide whereby yarn and fabric so produced has the following improved properties:

(1) Better light stability.
(2) Better heat stability than can be achieved with any other stabilizer effective as a light stabilizer.
(3) A fiber of lower cost.
(4) An improvement in dyeability.

The following examples will help to illustrate the invention.

Example 15

Four pounds of zinc chloride and 5.36 pounds of triethylphosphate were placed in a jacketed reaction kettle. The two were stirred with a sigma-blade mixer and 90 pounds of steam was placed in the heating jacket. After thirty minutes, the temperature of the reacting material had reached 140° C. and ethyl chloride was being evolved. After an hour the temperature was 145° C. where it was maintained for an additional thirty minutes. During this 1½ hour period, the viscosity increased, and about 75% of the theoretical amount of ethyl chloride was removed by vaporization. The reaction mixture was cooled to 95° C. by substituting cool water for the steam in the jacket. The cooling water was then shut off and 1.7 pounds of 70% mercaptoacetic acid was added. The temperature of 95° C. and stirring were maintained for an additional fifteen minutes. The product was then cooled to room temperature and was ready for use.

A copolymer of acrylonitrile/vinylidene chloride, 52.5/47.5, containing 17% poly-N-isopropylacrylamide was dissolved in acetone to make a solution of 27% solids. To this solution, 1.3% (based upon the weight of solids) of the zinc stabilizer was added. Yarn was spun by forcing this solution through small orifice into a drying chamber and winding the yarn on a package. The yarn was heated at 150° C. for five minutes and showed less coloration than yarn containing the known stabilizers phenyl-$\beta$-naphthylamine and dibutyl tin maleate. The stability to light was increased so that no color was apparent after 80 hours in a Fade-Ometer, a commercial instrument designed to expose samples to ultraviolet light under controlled conditions. Samples of yarn containing no inhibitor darkened after 20 hours. Samples containing the next best light stabilizer (dibutyl tin maleate) showed darkening after sixty hours. Yarn containing the stabilizer was found to be more easily dyed and darker shades of color were obtained with the same amount of dye than yarns containing no stabilizer or dibutyl tin maleate.

Example 16

Four pounds of zinc chloride and seven pounds of triethylphosphate were stirred and reacted at 130° C. for one hour. One and two-tenths pounds of 100% mercaptoacetic acid were added and the temperature was maintained at 135° C. for thirty minutes. The product was cooled and tested in yarn as in Example 15. The results in all respects were the same. No differences between the two stabilizers could be determined on the basis of their effectiveness.

As already made clearly apparent, any of the stabilizers covered by this invention can be used in the various halogenated mono-olefinic polymeric compositons including polyvinyl chloride in which tests conducted as described above demonstrate the advantages of this invention. Other polymers have also been tested and found to be similarly improved.

Although the invention has been described in considerable detail with reference to certain preferred embodiments thereof, it will be understood that variation and modifications can be effected without departing from the spirit and scope of the invention as described hereinabove and as defined in the appended claims.

We claim:

1. A resinous film-forming polymeric composition stabilized against color degradation due to actinic radiation comprising:
   (A) a polymeric component selected from the group consisting of
      (1) homopolymers of halogenated mono-olefinic organic hydrocarbons,
      (2) copolymers of halogenated mono-olefinic organic hydrocarbons with each other,
      (3) mixtures of a homopolymer of an N-alkylacrylamide wherein the alkyl group contains 1 to 6 carbon atoms and a polymer derived from at least 25 mole percent of a halogenated mono-olefinic organic hydrocarbon,
      (4) mixtures of a copolymer of an N-alkylacrylamide and an N-alkylmethacrylamide wherein each alkyl group contains 1 to 6 carbon atoms, and a polymer derived from at least 25 mole percent of a halogenated mono-olefinic organic hydrocarbon, and
      (5) mixtures of a copolymer of at least 50% by weight of an N-alkylacrylamide wherein the alkyl group contains 1 to 6 carbon atoms and a monovinyl pyridine monomer, and a polymer derived from at least 25 mole percent of a halogenated monoolefinic organic hydrocarbon, and
   (B) a stabilizing amount of a zinc compound selected from the group consisting of
      (1) zinc salts of mono- and dialkylated phosphates having a formula of $$Zn\begin{pmatrix}O\\ \diagdown\\ O\diagup\end{pmatrix}PO-OR \quad \text{or} \quad \begin{matrix}RO\\ \diagdown\\ RO\diagup\end{matrix}PO-O-Zn-O-PO\begin{matrix}\diagup OR\\ \diagdown OR\end{matrix}$$

wherein each R is an alkyl group,
      (2) zinc salts of mono- and dialkylated phosphites, and
      (3) zinc salts of mono- and dialkylated phosphonates.

2. A polymer composition as defined by claim 1 wherein said stabilizer is a zinc mono-alkylated phosphate.

3. A polymer composition as defined by claim 1 wherein said stabilizer is a zinc dialkylated phosphate.

4. A polymer composition as defined by claim 1 wherein said stabilizer is a zinc dialkylated phosphonate.

5. A polymer composition as defined by claim 1 wherein said stabilizer is a zinc dialkylated phosphite.

6. A polymer composition as defined by claim 1 wherein the polymeric component of the composition consist essentially of
   (A) 70% to 95% by weight of (A) plus (B) of a copolymer of from 30% to 65% by weight vinylidene chloride and 35% to 70% by weight of acrylonitrile, and
   (B) 5% to 30% by weight of (A) plus (B) of a homopolymer of an N-alkyl-acrylamide wherein the alkyl group contains from 1 to 6 carbon atoms.

7. A polymer composition as defined by claim 1 wherein the polymeric component of the composition consists essentially of
   (A) 70% to 95% by weight of (A) plus (B) of a copolymer of from 30% to 65% by weight vinylidene chloride and 35% to 70% by weight of acrylonitrile, and
   (B) 5% to 30% by weight of (A) plus (B) of a copolymer of N-alkyl-acrylamide and N-alkyl-methacrylamide wherein each alkyl grroup contains 1 to 6 carbon atoms.

8. A polymer composition as defined by claim 1 wherein the polymeric component of the composition consists essentially of
   (A) 70% to 95% by weight of (A) plus (B) of a copolymer of from 30% to 65% by weight vinylidene chloride and 35% to 70 by weight of acrylonitrile, and
   (B) 5% to 30% by weight of (A) plus (B) of a copolymer consisting of at least 50% by weight of an N-alkylacrylamide wherein the alkyl group contains 1 to 6 carbon atoms and not more than 50% by weight of a polymerizable monovinyl pyridine monomer.

References Cited

UNITED STATES PATENTS

| | | | |
|---|---|---|---|
| 3,030,334 | 4/1962 | Canarios et al. | 260—45.75 |
| 2,980,646 | 4/1961 | Lappin | 260—145.85 |
| 2,723,965 | 11/1955 | Leistner et al. | 260—45.7 |
| 2,906,731 | 9/1959 | Hill et al. | 260—45.75 |
| 2,934,507 | 4/1960 | Chadwick et al. | 260—45.75 |
| 2,997,454 | 9/1961 | Leistner | 260—45.75 |
| 2,581,915 | 1/1952 | Radcliffe | 260—45.75 |
| 2,615,860 | 10/1952 | Burgess | 260—45.75 |
| 2,628,952 | 2/1953 | Sanders et al. | 260—45.75 |
| 2,739,122 | 3/1956 | Kennerly et al. | 260—45.75 |
| 3,125,597 | 3/1964 | Wahl et al. | 260—45.85 |
| 2,849,420 | 8/1958 | Stevens et al. | 260—45.75 |
| 2,864,843 | 12/1958 | De Witt et al. | 260—429.9 |
| 2,883,406 | 4/1959 | Jezl | 260—429.9 |
| 2,885,416 | 5/1959 | Costabello et al. | 260—429.9 |
| 3,274,014 | 9/1966 | Harrington et al. | 260—45.75 |

FOREIGN PATENTS 1,041,243  10/1958  Germany.

DONALD E. CZAJA, *Primary Examiner.*

V. P. HOKE, *Assistant Examiner.*